United States Patent
Luo et al.

(10) Patent No.: US 11,265,368 B2
(45) Date of Patent: Mar. 1, 2022

(54) LOAD BALANCING METHOD, APPARATUS, AND SYSTEM

(71) Applicant: Huawei Technologies Co., Ltd., Shenzhen (CN)

(72) Inventors: Gaowei Luo, Shanghai (CN); Kunpeng Zhou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/030,457

(22) Filed: Jul. 9, 2018

(65) Prior Publication Data

US 2018/0324245 A1    Nov. 8, 2018

Related U.S. Application Data

(63) Continuation of application No. PCT/CN2017/094167, filed on Jul. 24, 2017.

(30) Foreign Application Priority Data

Dec. 29, 2016   (CN) .................. 201611251659.X (51) Int. Cl.
*H04L 29/08* (2006.01)
*H04L 67/1001* (2022.01)
(Continued)

(52) U.S. Cl.
CPC ........ *H04L 67/1002* (2013.01); *H04L 45/745* (2013.01); *H04L 61/2503* (2013.01); *H04L 61/2514* (2013.01); *H04L 61/2521* (2013.01)

(58) Field of Classification Search
CPC ............. H04L 67/1002; H04L 61/2514; H04L 61/2503; H04L 61/2521; H04L 45/745
See application file for complete search history.

(56) References Cited

U.S. PATENT DOCUMENTS

2001/0049741 A1   12/2001 Skene et al.
2003/0097429 A1*   5/2003 Wu .................. H04L 67/1002
                                                           709/220
(Continued)

FOREIGN PATENT DOCUMENTS

CN   102404229 A   4/2012
CN   102523302 A   6/2012
(Continued)

OTHER PUBLICATIONS

Zhang, H., et al., "SDN-Based Load Balancing Strategy for Server Cluster," XP033189910, IEEE 3rd International Conference on Cloud Computing and Intelligence Systems, Nov. 27, 2014, pp. 662-667.

(Continued)

*Primary Examiner* — Philip J Chea
*Assistant Examiner* — Wuji Chen
(74) *Attorney, Agent, or Firm* — Conley Rose, P.C.

(57) ABSTRACT

A load balancing system includes a load balancer and at least one service node, a virtual switch and at least one backend server run on the service node, and an Internet Protocol (IP) address of a logical interface of the backend server is an IP address of the load balancer, the load balancer receives an access request from a client, and changes a destination address of the access request to an IP address of a virtual network interface card of a destination backend server, and a virtual switch on a service node changes the destination address of the access request to the IP address of the load balancer when receiving the access request such that when the destination backend server returns an access response, a source address of the access response includes the address of the load balancer.

20 Claims, 5 Drawing Sheets

(51) Int. Cl.
  *H04L 45/745* (2022.01)
  *H04L 61/2514* (2022.01)
  *H04L 61/2503* (2022.01)
  *H04L 61/2521* (2022.01)

(56) References Cited

U.S. PATENT DOCUMENTS

| | | | |
|---|---|---|---|
| 2005/0257256 A1* | 11/2005 | Supnik | H04L 63/0209 726/11 |
| 2007/0288639 A1* | 12/2007 | Brown | H04L 47/125 709/226 |
| 2012/0239725 A1* | 9/2012 | Hartrick | H04L 69/163 709/203 |
| 2013/0246606 A1* | 9/2013 | Branch | H04L 41/0853 709/224 |
| 2014/0195666 A1 | 7/2014 | Dumitriu et al. | |
| 2015/0081879 A1* | 3/2015 | Branson | H04L 45/24 709/224 |
| 2015/0117454 A1* | 4/2015 | Koponen | H04L 61/2532 370/392 |
| 2015/0271075 A1* | 9/2015 | Zhang | H04L 47/125 370/235 |
| 2016/0080259 A1* | 3/2016 | Biancaniello | H04L 45/74 709/203 |
| 2018/0176307 A1* | 6/2018 | Kancherla | H04L 67/141 |
| 2018/0198854 A1* | 7/2018 | Rong | H04L 67/42 |

FOREIGN PATENT DOCUMENTS

| | | |
|---|---|---|
| CN | 102752188 A | 10/2012 |
| CN | 103023942 A | 4/2013 |
| CN | 103384255 A | 11/2013 |
| CN | 103491053 A | 1/2014 |
| CN | 104780115 A | 7/2015 |
| CN | 106131204 A | 11/2016 |
| CN | 106686085 A | 5/2017 |
| EP | 2741460 A1 | 6/2014 |
| WO | 2016164277 A1 | 10/2016 |

OTHER PUBLICATIONS

Foreign Communication From a Counterpart Application, European Application No. 17829578.8, Extended European Search Report dated Aug. 16, 2019, 10 pages.
Machine Translation and Abstract of Chinese Publication No. CN102404229, Apr. 4, 2012, 16 pages.
Machine Translation and Abstract of Chinese Publication No. CN102752188, Oct. 24, 2012, 14 pages.
Machine Translation and Abstract of Chinese Publication No. CN104780115, Jul. 15, 2015, 12 pages.
Foreign Communication From a Counterpart Application, Chinese Application No. 201611251659.X, Chinese Office Action dated Apr. 3, 2019, 9 pages.
Machine Translation and Abstract of Chinese Publication No. CN102523302, Jun. 27, 2012, 13 pages.
Machine Translation and Abstract of Chinese Publication No. CN103384255, Nov. 6, 2013, 17 pages.
Machine Translation and Abstract of Chinese Publication No. CN106686085, May 17, 2017, 23 pages.
Foreign Communication From a Counterpart Application, PCT Application No. PCT/CN2017/094167, International Search Report dated Oct. 24, 2017, 7 pages.
Foreign Communication From a Counterpart Application, PCT Application No. PCT/CN2017/094167, Written Opinion dated Oct. 24, 2017, 5 pages.

* cited by examiner

LOAD BALANCING METHOD, APPARATUS, AND SYSTEM

CROSS-REFERENCE TO RELATED APPLICATIONS

This application is a continuation of International Patent Application No. PCT/CN2017/094167 filed on Jul. 24, 2017, which claims priority to Chinese Patent Application No. 201611251659.X filed on Dec. 29, 2016. The disclosures of the aforementioned applications are hereby incorporated by reference in their entireties.

TECHNICAL FIELD

This application relates to the field of Information Technology (IT) technologies, and in particular, to a load balancing method, apparatus, and system.

BACKGROUND

A load balancing system includes a load balancer and multiple backend servers. The multiple backend servers (also referred to as members) form a server resource pool. The load balancer receives an access request from a client, and selects, for the client according to a load balancing algorithm, a backend server that provides a service. An Internet Protocol (IP) address of the load balancer is an IP address, presented to the outside, of the server resource pool. The client can access a backend server in the server resource pool using the IP address of the load balancer, with no need to know an address of the backend server. A mode in which the load balancer provides a load balancing service includes a direct routing (DR) mode and a network address translation (NAT) mode.

In the DR mode, an access response returned by the backend server to the client does not need to pass the load balancer. Therefore, transmission performance is relatively high. However, because the DR mode requires that the IP address of the load balancer and the IP address of the backend server belong to a same network segment, the backend server and the load balancer cannot be deployed across network segments. Consequently, the DR mode causes a relatively large restriction on networking of the load balancing system.

SUMMARY

Embodiments of this application provide a load balancing method, apparatus, and system in order to resolve a problem that a backend server and a load balancer cannot be deployed across network segments in a DR mode in a cloud computing network.

Specific technical solutions provided by the embodiments of this application are as follows.

According to a first aspect, a load balancing system is provided to implement deployment of a backend server and a load balancer across network segments in a DR mode in a cloud computing network. The system includes a load balancer and at least one service node, a virtual switch and at least one backend server run on the service node, and an IP address of a logical interface of the backend server is an IP address of the load balancer. The load balancer receives an access request from a client, and changes a destination address of the access request to an IP address of a virtual network interface card of a destination backend server, and when receiving the access request, a virtual switch on a service node changes the destination address of the access request to the IP address of the load balancer such that when the destination backend server returns an access response, a source address of the access response is the address of the load balancer.

In the foregoing manner, the IP addresses of the load balancer and the backend server may be configured to be IP addresses belonging to different network segments, and the returned service access response does not need to pass the load balancer, thereby ensuring network performance and resolving the problem that a backend server and a load balancer cannot be deployed across network segments in a DR mode in a cloud computing network.

In a possible design, the system further includes a network controller, where the network controller is configured to deliver a flow table to the virtual switch, where the flow table is used to instruct the virtual switch to change the destination address of the access request to the IP address of the load balancer when the virtual switch receives the access request that is to be sent to the destination backend server, and the virtual switch is configured to change the destination address of the access request according to the flow table.

In a possible design, the load balancing system uses an internal-network access mode, the load balancing system further includes a load balancing node, the load balancer and a first virtual router run on the load balancing node, and a gateway address of the load balancer and a gateway address of the destination backend server are configured on the first virtual router. The load balancer is further configured to send the access request to a first port of the first virtual router, where an address of the first port is the gateway address of the load balancer, and the first virtual router is configured to receive the access request, and send the access request using a second port, where an address of the second port is the gateway address of the destination backend server.

Further, a second virtual router runs on the destination service node, and a gateway address of the client and the gateway address of the destination backend server are configured on the second virtual router. The destination backend server is configured to send the access response to a third port of the second virtual router, where an address of the third port is the gateway address of the destination backend server, and the second virtual router is configured to receive the access response, and send the access response using a fourth port, where an address of the fourth port is the gateway address of the client.

In the foregoing internal-network access mode, the client accesses the load balancer using an internal-network address (a virtual IP address). The load balancer and the backend server are deployed on a same tenant network, the IP addresses of the load balancer and the backend server belong to different network segments of the same tenant network, and both the load balancer and the backend server can perform communication using virtual routers on nodes on which the load balancer and the backend server are located.

In a public-network access mode, the load balancer is a standalone physical server and has a public IP address. The client accesses the backend server using a public IP address of the load balancer. The backend server may be a virtual machine or a container that runs on a service node. The public IP address of the load balancer is associated with a virtual IP address. The virtual IP address, the IP address of the virtual network interface card of the backend server, and an IP address of a logical interface of the backend server belong to different network segments of a same tenant network. Further, to distinguish between different tenants, the load balancer and the backend server further have a local area network IP address.

In the public-network access mode, a third virtual router runs on the destination service node, the destination backend server further has a local area network IP address that is associated with the IP address of the virtual network interface card of the destination backend server, and the local area network IP address is used to implement network isolation between different tenants. The load balancer is further configured to change the destination address of the access request to the local area network IP address of the destination backend server, and send the access request to the destination service node on which the destination backend server is located, and the third virtual router on the destination service node is further configured to receive the access request, change the destination address of the access request to the IP address of the virtual network interface card of the destination backend server, and send the access request to the virtual switch.

Further, the IP address of the load balancer is further associated with a public IP address, and the virtual switch is further configured to receive the access response, change the source address of the access response to the public IP address with which the IP address of the load balancer is associated, and return the access response to the client.

In the foregoing manner, the load balancing method is implemented in two scenarios of the internal-network access mode and the public-network access mode. In the foregoing method, the IP addresses of the load balancer and the backend server may be configured to be IP addresses belonging to different network segments, and the returned service access response does not need to pass the load balancer, thereby ensuring network performance and resolving the problem that a backend server and a load balancer cannot be deployed across network segments in a DR mode in a cloud computing network.

According to a second aspect, a load balancing method is provided. The method is applied to the load balancing system in the first aspect, the load balancing system includes a load balancer and at least one service node, a virtual switch and at least one backend server run on the service node, and an IP address of a logical interface of the backend server is an IP address of the load balancer, and the method includes receiving, by the load balancer, an access request from a client, selecting a destination backend server for the client, changing a destination address of the access request to an IP address of a virtual network interface card of the destination backend server, sending the access request to the destination service node on which the destination backend server is located, receiving, by the virtual switch on the destination service node, the access request, changing the destination address of the access request to the IP address of the load balancer, sending the access request to the destination backend server, receiving and processing, by the destination backend server, the access request, and returning an access response to the client, where a source address of the access response is the IP address of the load balancer.

In the method according to the second aspect, the components in the load balancing system perform steps in the first aspect.

According to a third aspect, a service node is provided. A virtual switch and at least one backend server run on the service node, the at least one backend server is allocated by a load balancer to a client to provide a service, and an IP address of a logical interface of the backend server is an IP address of the load balancer. The virtual switch on the service node is configured to receive an access request that is from the client and that is sent by the load balancer, where a destination address of the access request is an IP address of a virtual network interface card of the backend server. The virtual switch is further configured to change the destination address of the access request to the IP address of the load balancer, and send the access request to the backend server, and the backend server is configured to receive and process the access request, and return an access response to the client, where a source address of the access response is the IP address of the load balancer.

In a possible design of the third aspect, the virtual switch, a virtual router, and the backend server that are on the service node perform the steps, performed by corresponding components, in the first aspect.

According to a fourth aspect, another load balancing method is provided. A virtual switch, a virtual router, and a backend server that are on a service node perform the steps, performed by corresponding components, in the first aspect.

According to a fifth aspect, another load balancing system in a virtualization environment is provided and applied to a public-network access mode. The system includes a load balancer and at least one service node, a virtual switch, a virtual router, and at least one backend server run on the service node, the load balancer and the backend server are located on a same tenant network, and an IP address of a logical interface of the backend server is a virtual IP address of the load balancer. The load balancer is configured to receive an access request from a client, select a destination backend server for the client, change a destination address of the access request to a local area network IP address of the backend server, and send the access request to a destination service node on which the destination backend server is located. A virtual router on the destination service node is configured to receive the access request, change the destination address of the access request from the local area network IP address of the destination backend server to an IP address of a virtual network interface card of the destination backend server according to a first flow table, and send the access request to a virtual switch on the destination service node. The virtual switch is configured to change the destination address of the access request to an IP address of a logical interface of the destination backend server according to a second flow table, and send the access request to the destination backend server. The destination backend server is configured to receive and process the access request, and return an access response, where a source address of the access response is changed to the virtual IP address of the load balancer, and the virtual router is further configured to change the source address of the access response to a public IP address of the load balancer according to a third flow table.

According to a sixth aspect, a service node in a load balancing system is provided. The service node is a physical server, and has a function of implementing a behavior of each component on the service node in the first aspect and any possible design. The function may be implemented by hardware, or may be implemented by executing corresponding software by hardware. The hardware or software includes one or more modules corresponding to the foregoing function.

In a possible design, the service node includes a transceiver and a processor, where the processor is configured to invoke a set of program code to execute the method in the fourth aspect.

According to a seventh aspect, a computer storage medium is provided, and is configured to store a computer software instruction used by the service node according to the foregoing aspects. The computer software instruction includes a program designed to perform the foregoing aspects.

DESCRIPTION OF EMBODIMENTS

The following further describes this application with reference to the accompanying drawings.

Figure 1:
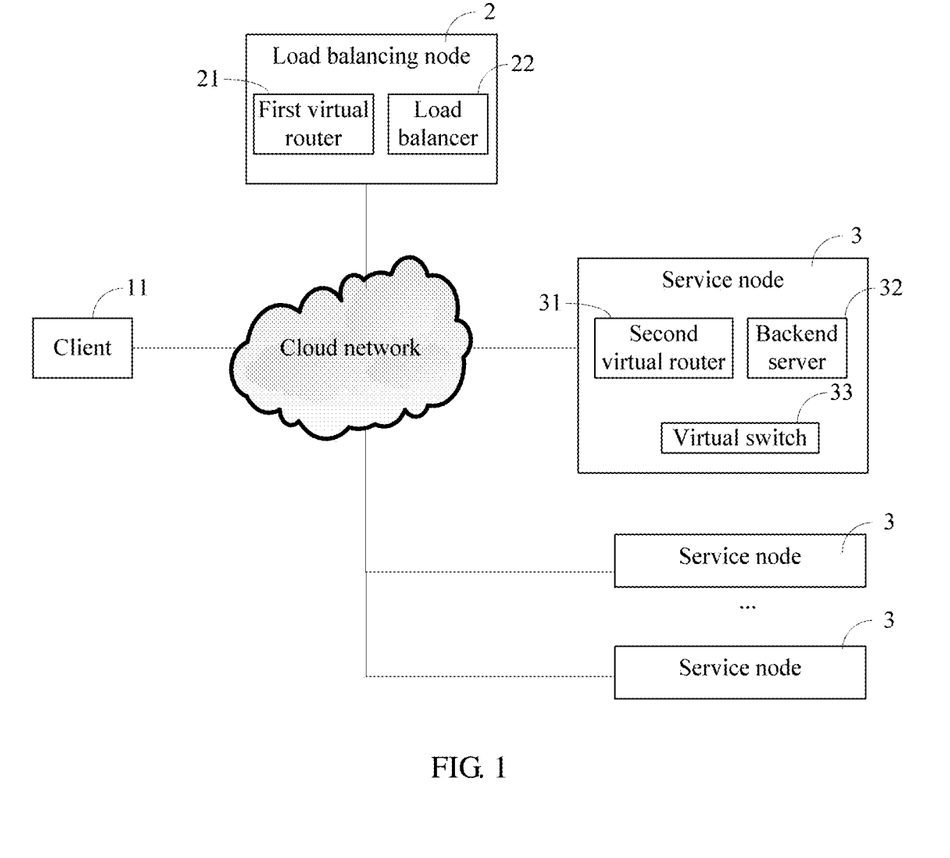
FIG. 1 is a schematic structural diagram of a load balancing system in a virtualization environment according to an embodiment of the present disclosure.
Figure 2:
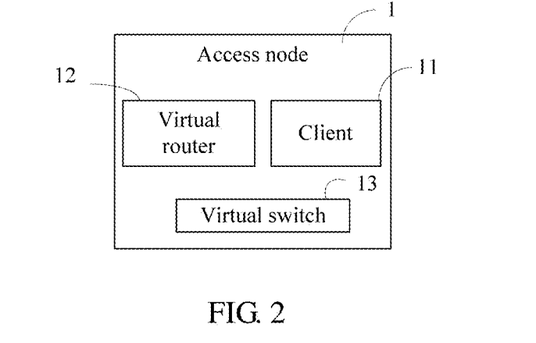
FIG. 2 is a schematic structural diagram of a access node according to an embodiment of the present disclosure.

As shown in FIG. 1, FIG. 1 is a schematic structural diagram of a load balancing system according to an embodiment of the present disclosure. The system includes a client 11, a load balancing node 2, and a service node 3. A first virtual router 21 and a load balancer 22 run on the load balancing node 2. A second virtual router 31, at least one backend server 32 (in FIG. 1, one backend server is used as an example), and a virtual switch 33 run on the service node 3. In the load balancing system, there may be multiple clients 11, multiple load balancing nodes 2, and multiple service nodes 3. The multiple service nodes 3 form a server resource pool to provide a service for the clients 11. Optionally, the load balancing nodes 2 may be deployed in a distributed manner. This is not limited in this embodiment of the present disclosure. The client 11, the load balancing node 2, and the service node 3 communicate with each other using a cloud network. For example, as shown in FIG. 2, the client 11 may run on an access node 1, and the access node 1 further includes a virtual router 12 and a virtual switch 13. Further, the client 11 may be a virtual machine or a container. Optionally, both the load balancer 22 and the backend server 32 may be a virtual machine or a container that runs on a physical node.

A tenant may deploy the client 11 on the access node 1, and configure an IP address for the client 11. For example, the IP address of the client 11 is 192.168.1.10/24. The tenant deploys the load balancer 22 on the load balancing node 2, configures a NAT mode for the load balancer 22, and allocates an IP address to the load balancer 22. For example, the IP address of the load balancer 22 is 192.168.2.10/24. The tenant configures the backend server 32 on the service node 3, and allocates IP addresses to the backend server 32. The IP addresses of the backend server 32 include an IP address of a virtual network interface card of the backend server 32 and an IP address of a logical interface of the backend server 32. The IP address of the logical interface of the backend server 32 is the IP address of the load balancer 22. For example, the IP address of the virtual network interface card of the backend server 32 is 192.168.3.10/24, and the IP address of the logical interface of the backend server 32 is 192.168.2.10/24. A cloud management platform configures a gateway address of the client 11, a gateway address of the load balancer 22, and a gateway address of the backend server 32 for multiple ports of a virtual router (12/21/31) on each node. A system structure shown in FIG. 1 corresponds to an internal-network access mode.

Figure 3:
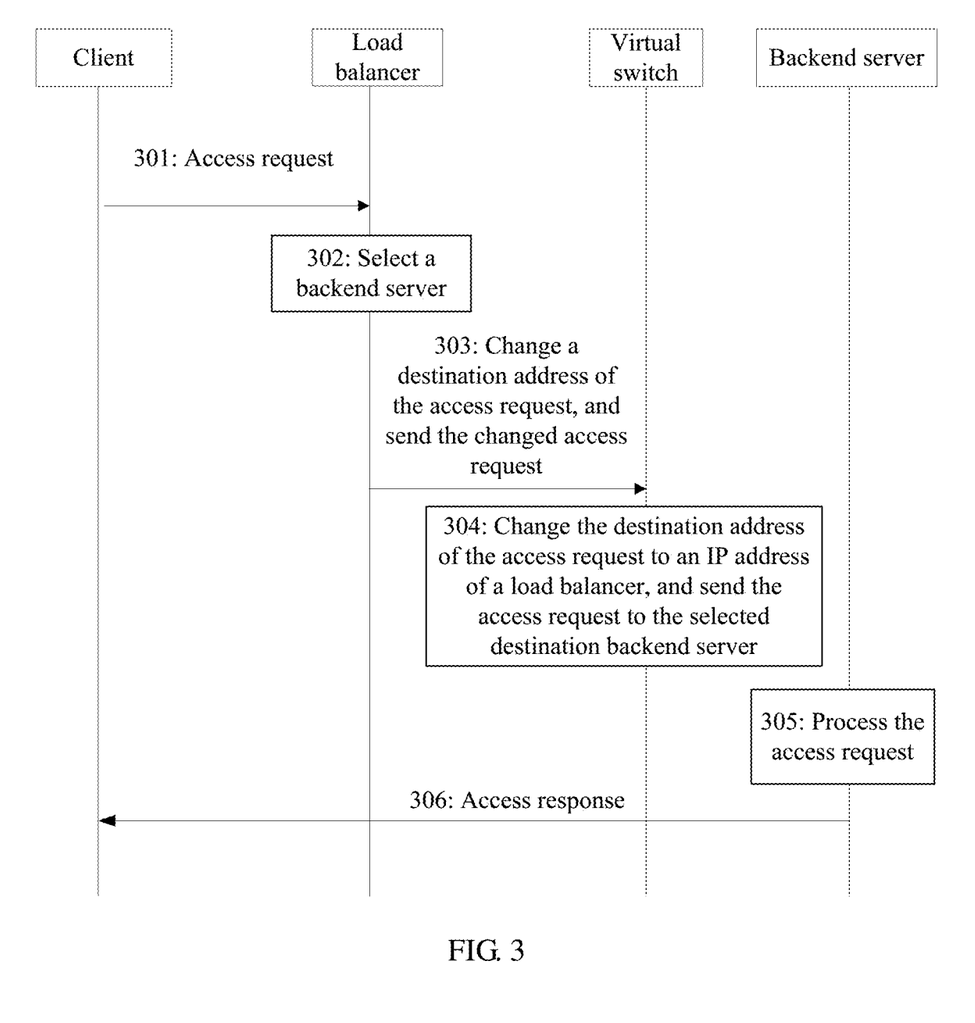
FIG. 3 is a schematic flowchart of a load balancing method according to an embodiment of the present disclosure.

Based on the system structure shown in FIG. 1, as shown in FIG. 3, FIG. 3 is a schematic flowchart of a load balancing method according to an embodiment of the present disclosure. The method includes the following steps.

Step 301: A client sends an access request to a load balancer, where a source address of the access request is an IP address of the client, and a destination address of the access request is an IP address of the load balancer.

In a possible implementation scenario, the IP address of the load balancer is presented to the client, and is used as an entry address used by the client to request a backend server in a server resource pool. Further, in a cloud computing scenario, the IP address of the load balancer is also referred to as a virtual IP address. The destination address of the access request sent by the client is a virtual IP address of the load balancer.

The source IP address of the access request is 192.168.1.10, and the destination IP address of the access request is 192.168.2.10. The access request is sent to a port 1 (a port corresponding to a gateway address of the client) of a virtual router on the access node. A port (for example, a port 2) corresponding to a gateway address of the load balancer is configured on the virtual router on the access node on which the client is located. Therefore, after receiving the access request, the port 1 of the virtual router on the access node sends, according to the destination address (i.e., 192.168.2.10) of the access request, the access request using the port 2 to the IP address 192.168.2.10 of the load balancer.

Step 302: After receiving the access request, the load balancer selects, for the client based on a load balancing algorithm, a backend server that provides a service.

The load balancer uses a NAT mode. The load balancer records a backend server list, and selects, from the backend server list according to the load balancing algorithm, the backend server that provides a service. In a possible implementation scenario, backend server information is stored in a LINUX Virtual Server (LVS) software configuration of a load balancing server. Therefore, the load balancer may obtain an address of the selected backend server.

Step 303: The load balancer changes the destination address of the access request, and send the changed access request. The load balancer performs NAT on the destination address of the access request to change the destination address (i.e., 192.168.2.10) of the access request to an IP address (i.e., 192.168.3.10) of a virtual network interface card of the backend server.

The load balancer forwards the access request. In this case, the source address of the access request is 192.168.1.10, and the destination IP address of the access request is 192.168.3.10. The load balancer sends the access request to a first port of the first virtual router, where an address of the first port is the gateway address of the load balancer. The first virtual router receives the access request, and sends the access request using a second port, where an address of the second port is a gateway address of the destination backend server.

Step 304: A virtual switch on a service node on which the backend server is located receives the access request, changes the destination address of the access request to the IP address of the load balancer, and sends the access request to the selected destination backend server.

The virtual switch receives a flow table delivered by a network controller, where the flow table is used to instruct the virtual switch to change the destination address of the access request to the IP address of the load balancer when the virtual switch receives the access request that is to be sent to the destination backend server. The virtual switch changes the destination address of the access request to the IP address (i.e., 192.168.2.10) of the load balancer according to the flow table. An IP address of a logical interface of the backend server is the IP address of the load balancer. Therefore, after the virtual switch changes the destination address of the access request to the IP address of the load balancer, the access request may be sent to the backend server.

Step 305: The backend server receives and processes the access request.

Step 306: The backend server returns an access response to the client, where a source address of the access response is the IP address of the load balancer.

The source IP address of the access request received by the backend server is the IP address (i.e., 192.168.1.10) of the client, and the destination IP address of the access request is the IP address (i.e., 192.168.2.10) of the load balancer. The backend server processes the access request and returns the access response. The source IP address of the access response is the IP address (i.e., 192.168.2.10) of the load balancer, and a destination IP address of the access response is the IP address (i.e., 192.168.1.10) of the client. The gateway address of the client and the gateway address of the destination backend server are configured on a second virtual router on the service node on which the backend server is located. The destination backend server sends the access response to a third port of the second virtual router, where an address of the third port is the gateway address of the destination backend server. The second virtual router receives the access response, and sends the access response using a fourth port, where an address of the fourth port is the gateway address of the client.

After the access response arrives at the access node on which the client is located, a virtual switch on the access node sends the access response to the client according to the destination address of the access response.

It should be noted that because the destination address of the access request is the IP address of the load balancer, the backend server can directly use the IP address of the load balancer as the source address of the access response.

Figure 4:
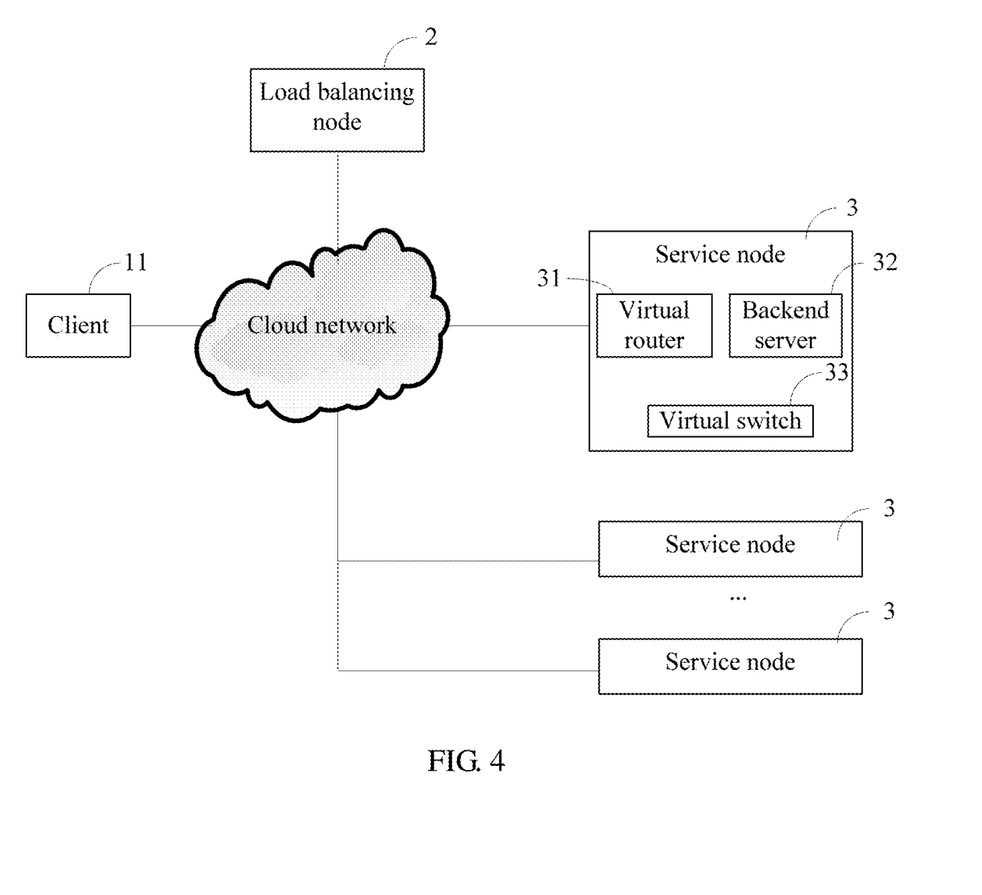
FIG. 4 is a schematic structural diagram of another load balancing system in a virtualization environment according to an embodiment of the present disclosure.

As shown in FIG. 4, FIG. 4 is a schematic structural diagram of another load balancing system according to an embodiment of the present disclosure. This embodiment is based on a public-network access mode. That is, an address, presented to the outside, of a load balancer is a public IP address (for example, 9.9.9.9). A client 11 accesses the public IP address, the load balancer selects, for the client 11, a backend server 32 to provide a service, and an internal network of a hardware resource pool formed by backend servers 32 is invisible to the client 11. A service node 3 including the backend server 32 further includes virtual router 31 and a virtual switch 33. The client 11, a load balancing node 2 and the service node 3 communicate with each other using a cloud network.

An IP address of the client 11 is a public IP address (for example, 8.8.8.8).

In an embodiment, a tenant deploys the load balancer in the load balancing node 2, and configures a NAT mode for the load balancer. The load balancer is deployed in a form of a physical server, and provides a load balancing service for the client 11. A virtual IP address (for example, 192.168.2.10) of the load balancer is further associated with the public IP address (9.9.9.9). The client 11 uses the public IP address of the load balancer to access the load balancer. The load balancer and the backend server 32 that runs on the service node 3 are on a same internal network. Therefore, a local area network IP address (for example, 100.100.100.100) is further configured on an address of a physical interface of the load balancer.

The tenant configures the backend server 32 on the service node 3, and allocates IP addresses to the backend server 32. The IP addresses of the backend server 32 include an IP address (for example, 192.168.3.10) of a virtual network interface card of the backend server 32 and an IP address (for example, 192.168.2.10) of a logical interface of the backend server 32. The IP address of the logical interface of the backend server 32 is the IP address of the load balancer. The IP address of the virtual network interface card of the backend server 32 is further associated with a local area network IP address (for example, 100.120.2.10) of the backend server 32.

The virtual IP of the load balancer is associated with the backend server 32 that runs on the service node 3.

A load balancer and a backend server that belong to a same tenant are configured onto a same tenant network. Load balancers and backend servers on different tenant networks may be distinguished using local area network IP addresses. Therefore, backend servers of different tenants may use a same IP address of a virtual network interface card, and load balancers of different tenants may use a same virtual IP address. For example, an IP address of a virtual network interface card of a backend server, running on a service node in the hardware resource pool, of a tenant A is 192.168.3.10, and an IP address of a virtual network interface card of a backend server, running on a service node in the hardware resource pool, of a tenant B may also be 192.168.3.10.

Figure 5:
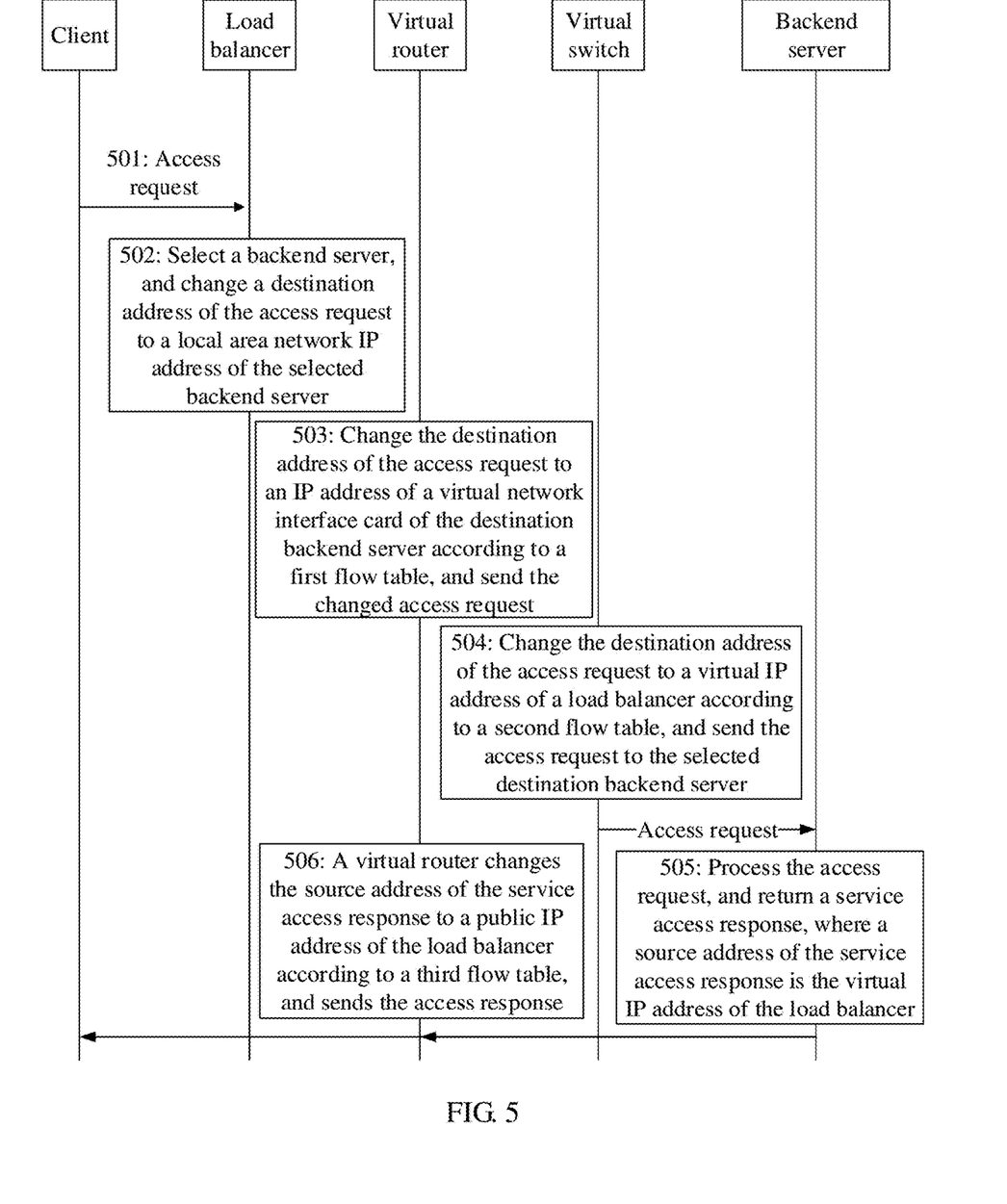
FIG. 5 is a schematic flowchart of another load balancing method according to an embodiment of the present disclosure.

With reference to a structure of the load balancing system shown in FIG. 4, as shown in FIG. 5, FIG. 5 is a flowchart of another load balancing method according to an embodiment of the present disclosure. The method includes the following steps.

Step 501: A client sends an access request to a load balancer, where the client accesses, using a public IP address (i.e., 8.8.8.8), a public IP address (i.e., 9.9.9.9) with which a virtual IP address of the load balancer is associated.

The client may configure, using an intermediate device such as a switch, a route with a next hop to 100.100.100.100, to reach the load balancer.

Step 502: The load balancer receives the access request, selects, according to a load balancing algorithm, a backend server that provides a service for the client, changes a destination address of the access request to a local area network IP address of the backend server, and sends the access request to a service node on which the destination backend server is located.

Further, because a NAT mode is configured for an LVS deployed on the load balancer, a load balancing server performs translation on a packet. A destination IP address obtained by means of translation is the local area network IP address (i.e., 100.120.2.10) of the selected backend server, and a source IP address of the access request remains unchanged and is still 8.8.8.8. The load balancing server sends the access request to the service node on which the backend server is located.

The load balancer may establish a tunnel with the service node on which the backend server is located, and transmit the access request using the tunnel. The tunnel may be established using a solution in other approaches. This is not limited in this embodiment of the present disclosure.

Step 503: The service node on which the selected destination backend server is located receives the access request, and forwards the access request to a virtual router on the service node, where gateway addresses of all backend servers on this node are configured on the virtual router, and the virtual router changes the destination address of the access request from the local area network IP address of the destination backend server to an IP address of a virtual network interface card of the destination backend server according to a first flow table, and sends the changed access request to a virtual switch on the service node.

In a specific scenario, a tenant may manage a load balancing network, and deliver the first flow table to the virtual router using a network controller, where the first flow table is used to instruct the virtual router to change the destination address of the access request to the IP address of the virtual network interface card of the backend server when the virtual router receives the access request whose destination address is the local area network IP address of the backend server.

Step 504: The virtual switch receives the access request, changes the destination address of the access request to an IP address (that is, the virtual IP address of the load balancer) of a logical interface of the destination backend server according to a second flow table, and sends the access request to the selected destination backend server.

In a specific scenario, when managing the load balancing network, the tenant configures the second flow table in the virtual switch using the network controller, where the second flow table is used to instruct the virtual switch to change the destination address of the access request to the IP address (i.e., 192.168.2.10) of the logical interface of the backend server when the virtual switch receives the access request whose destination address is the IP address (i.e., 192.168.3.10) of the virtual network interface card of the backend server.

Step 505: The destination backend server receives the access request sent by the virtual switch, processes the access request, and returns a service access response, where a source address of the service access response is the IP address (that is, the virtual IP address of the load balancer) of the logical interface of the destination backend server, and a destination address of the service access response is the public IP address of the client.

Step 506: Because a next hop of a default route of the backend server is a gateway address (i.e., 192.168.3.1), a packet is first sent to the virtual router on the service node, and the virtual router changes the source address of the service access response to a public IP address of the load balancer according to a third flow table, and the virtual router sends the service access response to the client.

In a specific scenario, when managing the load balancing network, the tenant delivers the third flow table to the virtual router using the network controller, where the third flow table is used to instruct the virtual router to change a source address of the packet to the public IP address of the load balancer when the virtual router receives the packet (which may include the service access response) whose source address is the virtual IP address of the load balancer.

It should be noted that in step 503 and step 504, the destination address of the access request has been changed twice. At the first time, the virtual router changes the destination address of the access request from the local area network IP address of the destination backend server to the IP address of the virtual network interface card of the destination backend server. At the second time, the virtual switch changes the destination address of the access request from the IP address of the virtual network interface card of the destination backend server to the virtual IP address of the load balancer. In a possible implementation, step 503 and step 504 may be directly replaced with the following step where when receiving the access request, the virtual switch on the service node on which the destination backend server is located changes the destination address of the access request to the virtual IP address of the load balancer (that is, changes the destination address of the access request from the local area network IP address of the destination backend server to the virtual IP address of the load balancer) according to a flow table delivered by the network controller, and then sends the access request to the destination backend server. In the substitute step, only one destination address change needs to be performed.

It should be noted that because both the source address and the destination address of the service access response are public IP addresses, the service access response may be accurately routed to the client without passing the load balancer, and because the source address of the service access response is the public IP address of the load balancer, an internal-network address of the load balancing system is invisible to the client, and the client determines, according to the source address of the service access response, that the service access response is sent by the load balancer.

In the foregoing process, the returned service access response does not pass the load balancer, thereby implementing a DR mode of load balancing.

The embodiments of the present disclosure provide the load balancing method implemented in two scenarios of an internal-network access mode and a public-network access mode. In the foregoing method, the IP addresses of the load balancer and the backend server may be configured to be IP addresses belonging to different network segments, and the returned service access response does not need to pass the load balancer, thereby ensuring network performance and resolving a problem that a backend server and a load balancer cannot be deployed across network segments in a DR mode in a cloud computing network.

In the embodiments of the present disclosure, a backend server may be a virtual machine or a container that runs on a service node. An address of the backend server is an address of the virtual machine or the container.

Figure 6:
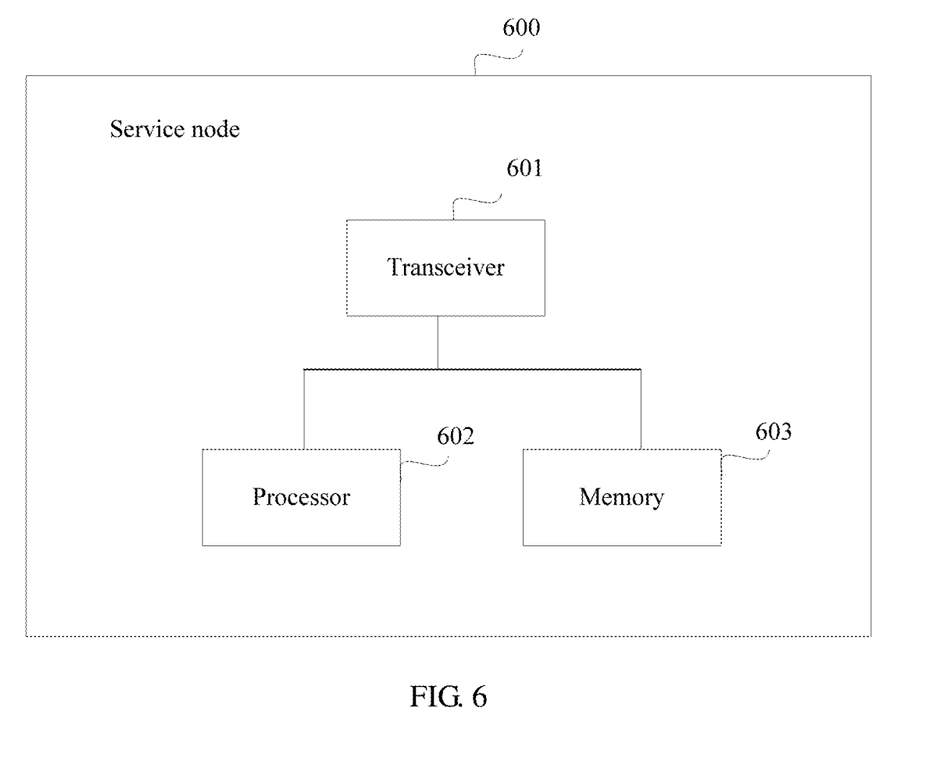
FIG. 6 is a schematic structural diagram of hardware of a service node according to an embodiment of the present disclosure.

Based on a same inventive concept, referring to FIG. 6, an embodiment of this application further provides a schematic structural diagram of hardware of a service node 600. The service node 600 includes a transceiver 601, a processor 602, and a memory 603. Both the transceiver 601 and the memory 603 are connected to the processor 602. It should be noted that a connection manner of the components shown in FIG. 6 is merely a possible example. Alternatively, a connection manner of the components may be that both the transceiver 601 and the memory 603 are connected to the processor 602, but there is no connection between the transceiver 601 and the memory 603, or may be another possible connection manner.

The memory 603 stores a set of programs. The processor 602 is configured to invoke the set of programs stored in the memory 603 to execute a function of each module on the service node in the load balancing system and the load balancing method that are shown in FIG. 1 to FIG. 5.

In FIG. 6, the processor 602 may be a central processing unit (CPU), a network processor (NP), or a combination of a CPU and an NP.

The processor 602 may further include a hardware chip. The hardware chip may be an application-specific integrated circuit (ASIC), a programmable logic device (PLD), or a combination thereof. The PLD may be a complex PLD (CPLD), a field-programmable logic gate array (FPGA), a generic array logic (GAL), or any combination thereof.

The memory 603 may include a volatile memory such as a random access memory (RAM), or the memory 603 may include a non-volatile memory such as a flash memory, a hard disk drive (HDD) or a solid-state drive (SSD), or the memory 603 may include a combination of the foregoing types of memories.

A physical server on which a load balancer is located may also use the hardware structure shown in FIG. 6. Details are not described in this embodiment of the present disclosure.

A person skilled in the art should understand that the embodiments of this application may be provided as a method, a system, or a computer program product. Therefore, this application may use forms of hardware embodiments, software embodiments, or embodiments with a combination of software and hardware. Moreover, this application may use a form of a computer program product that is implemented on one or more computer-usable storage media (including but not limited to a disk memory, a compact disc read only memory (CD-ROM), an optical memory, and the like) that include computer usable program code.

The computer program code may be stored in a computer readable memory that is capable of enabling a computer or another programmable data processing device to operate in a particular way.

A person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A load balancing system in a virtualization environment, comprising:
   a load balancer operating in direct routing mode; and
   at least one service node coupled to the load balancer, wherein a virtual switch and at least one backend server are configured to run on the at least one service node,
   wherein an Internet Protocol (IP) address of a logical interface of the at least one backend server comprises an IP address of the load balancer,
   wherein the load balancer is configured to:
      receive an access request from a client;
      select a destination backend server for the client;
      change a destination address of the access request to an IP address of a virtual network interface card of the destination backend server, wherein the IP address of the load balancer and the IP address of the virtual network interface card belong to different network segments using different local area network IP addresses; and
      send the access request to a destination service node on which the destination backend server is located,
   wherein a virtual switch on the destination service node is configured to:
      receive the access request;
      change the destination address of the access request to the IP address of the load balancer; and
      send the access request to the destination backend server, and
   wherein the destination backend server is configured to:
      receive and process the access request; and
      return an access response to the client without control of the load balancer, wherein a source address of the access response comprises the IP address of the load balancer.

2. The load balancing system of claim 1, further comprising a network controller, wherein the network controller is configured to deliver a flow table to the virtual switch on the destination service node, wherein the flow table instructs the virtual switch on the destination service node to change the destination address of the access request to the IP address of the load balancer when the virtual switch on the destination service node receives the access request that is to be sent to the destination backend server, and wherein the virtual switch on the destination service node is further configured to change the destination address of the access request according to the flow table.

3. The load balancing system of claim 1, further comprising a load balancing node, wherein the load balancer and a first virtual router are configured to run on the load balancing node, wherein a gateway address of the load balancer and a gateway address of the destination backend server are configured on the first virtual router, wherein the load balancer is further configured to send the access request to a first port of the first virtual router, wherein an address of the first port comprises the gateway address of the load balancer, and wherein the first virtual router is configured to:
   receive the access request; and
   send the access request using a second port, wherein an address of the second port comprises the gateway address of the destination backend server.

4. The load balancing system of claim 3, wherein a second virtual router is configured to run on the destination service node, wherein a gateway address of the client and the gateway address of the destination backend server are configured on the second virtual router, wherein the destination backend server is further configured to send the access response to a third port of the second virtual router, wherein an address of the third port comprises the gateway address of the destination backend server, and wherein the second virtual router is configured to:
   receive the access response; and
   send the access response using a fourth port, wherein an address of the fourth port comprises the gateway address of the client.

5. The load balancing system of claim 1, wherein a third virtual router is configured to run on the destination service node, wherein the destination backend server further has a local area network IP address associated with the IP address of the virtual network interface card of the destination backend server, wherein the local area network IP address implements network isolation among different tenants, wherein the load balancer is further configured to:
   change the destination address of the access request to the local area network IP address associated with the IP address of the virtual network interface card of the destination backend server; and
   send the access request to the destination service node on which the destination backend server is located, and
   wherein the third virtual router on the destination service node is further configured to:
      receive the access request;

change the destination address of the access request to the IP address of the virtual network interface card of the destination backend server; and send the access request to the virtual switch on the destination service node.

6. The load balancing system of claim 5, wherein the IP address of the load balancer is further associated with a public IP address, and wherein the virtual switch on the destination service node is further configured to:

receive the access response;

change the source address of the access response to the public IP address with which the IP address of the load balancer is associated; and return the access response to the client.

7. A load balancing method, applied to a load balancing system comprising a load balancer operating in direct routing mode and at least one service node, wherein a virtual switch and at least one backend server are configured to run on the at least one service node, wherein an Internet Protocol (IP) address of a logical interface of the at least one backend server comprises an IP address of the load balancer, and wherein the load balancing method comprises:

receiving, by the load balancer, an access request from a client;

selecting, by the load balancer, a destination backend server for the client;

changing, by the load balancer, a destination address of the access request to an IP address of a virtual network interface card of the destination backend server, wherein the IP address of the load balancer and the IP address of the virtual network interface card belong to different network segments using different local area network IP addresses;

sending, by the load balancer, the access request to a destination service node on which the destination backend server is located;

receiving, by a virtual switch on the destination service node, the access request;

changing, by the virtual switch on the destination service node, the destination address of the access request to the IP address of the load balancer;

sending, by the virtual switch on the destination service node, the access request to the destination backend server;

receiving and processing, by the destination backend server, the access request; and returning, by the destination backend server, an access response to the client without control of the load balancer, wherein a source address of the access response comprises the IP address of the load balancer.

8. The load balancing method of claim 7, wherein changing the destination address of the access request to the IP address of the load balancer comprises receiving, by the virtual switch on the destination service node, a flow table from a network controller, wherein the flow table instructs the virtual switch on the destination service node to change the destination address of the access request to the IP address of the load balancer according to the flow table when the virtual switch on the destination service node receives the access request that is to be sent to the destination backend server.

9. The load balancing method of claim 7, wherein the load balancing system further comprises a load balancing node, wherein the load balancer and a first virtual router are configured to run on the load balancing node, wherein a gateway address of the load balancer and a gateway address of the destination backend server are configured on the first virtual router, and wherein sending the access request to the destination service node on which the destination backend server is located comprises:

sending, by the load balancer, the access request to a first port of the first virtual router, wherein an address of the first port comprises the gateway address of the load balancer;

receiving, by the first virtual router, the access request; and sending, by the first virtual router, the access request using a second port, wherein an address of the second port comprises the gateway address of the destination backend server.

10. The load balancing method of claim 9, wherein a second virtual router is configured to run on the destination service node, wherein a gateway address of the client and the gateway address of the destination backend server are configured on the second virtual router, and wherein returning the access response to the client comprises:

sending, by the destination backend server, the access response to a third port of the second virtual router, wherein an address of the third port comprises the gateway address of the destination backend server;

receiving, by the second virtual router, the access response; and sending, by the second virtual router, the access response using a fourth port, wherein an address of the fourth port comprises the gateway address of the client.

11. The load balancing method of claim 7, wherein a third virtual router is configured to run on the destination service node, wherein the destination backend server further has a local area network IP address associated with the IP address of the virtual network interface card of the destination backend server, wherein the local area network IP address implements network isolation between different tenants, wherein changing the destination address of the access request and sending the access request to the destination service node comprises:

changing, by the load balancer, the destination address of the access request to the local area network IP address associated with the IP address of the virtual network interface card of the destination backend server; and sending the access request to the destination service node on which the destination backend server is located, and wherein before receiving, by the virtual switch on the destination service node, the access request, the load balancing method further comprises:

receiving, by the third virtual router on the destination service node, the access request;

changing, by the third virtual router on the destination service node, the destination address of the access request to the IP address of the virtual network interface card of the destination backend server; and sending, by the third virtual router on the destination service node, the access request to the virtual switch on the destination service node.

12. A service node, comprising:

at least one backend server; and a virtual switch coupled to the at least one backend server and configured to:

receive an access request of a client from a load balancer operating in direct routing mode, wherein the at least one backend server is allocated by the load balancer to the client to provide a service, wherein an Internet Protocol (IP) address of a logical interface of the at least one backend server comprises an IP address of the load balancer, and wherein a destination address of the access request comprises an IP address of a virtual network interface card of the at least one backend server;

change the destination address of the access request to the IP address of the load balancer, wherein the IP address of the load balancer and the IP address of the virtual network interface card belong to different network segments using different local area network IP addresses; and send the access request to the at least one backend server, and wherein the at least one backend server is configured to:
receive and process the access request; and
return an access response to the client without control of the load balancer, wherein a source address of the access response comprises the IP address of the load balancer.

13. The service node of claim 12, wherein the virtual switch is further configured to receive a flow table from a network controller, and wherein the flow table instructs the virtual switch to change the destination address of the access request to the IP address of the load balancer according to the flow table when the virtual switch receives the access request that is to be sent to the at least one backend server.

14. The service node of claim 12, wherein a second virtual router coupled to the virtual switch and the at least one backend server and configured to run on the service node, wherein a gateway address of the client and a gateway address of the at least one backend server are configured on the second virtual router, wherein the at least one backend server is further configured to send the access response to a third port of the second virtual router, wherein an address of the third port comprises the gateway address of the at least one backend server, and wherein the second virtual router is configured to:

receive the access response; and
send the access response using a fourth port, wherein an address of the fourth port comprises the gateway address of the client.

15. The service node of claim 12, wherein a third virtual router coupled to the virtual switch and the at least one backend server and configured to run on the service node, wherein the at least one backend server further has a local area network IP address associated with the IP address of the virtual network interface card of the at least one backend server, wherein the local area network IP address implements network isolation between different tenants, and wherein the third virtual router on the service node is further configured to:

receive the access request;
change the destination address of the access request to the IP address of the virtual network interface card of the at least one backend server; and
send the access request to the virtual switch.

16. The service node of claim 15, wherein the IP address of the load balancer is further associated with a public IP address, and wherein the virtual switch is further configured to:

receive the access response;
change the source address of the access response to the public IP address with which the IP address of the load balancer is associated; and
return the access response to the client.

17. A load balancing method, wherein the load balancing method is executed on a service node, wherein a virtual switch and at least one backend server are configured to run on the service node, wherein the at least one backend server is allocated by a load balancer operating in direct routing mode to a client to provide a service, wherein an Internet Protocol (IP) address of a logical interface of the at least one backend server comprises an IP address of the load balancer, and wherein the load balancing method comprises:

receiving, by the virtual switch, an access request of the client from the load balancer, wherein a destination address of the access request comprises an IP address of a virtual network interface card of the at least one backend server;

changing, by the virtual switch, the destination address of the access request to the IP address of the load balancer, wherein the IP address of the load balancer and the IP address of the virtual network interface card belong to different network segments using different local area network IP addresses;

sending, by the virtual switch, the access request to the at least one backend server;

receiving and processing, by the at least one backend server, the access request; and returning, by the at least one backend server, an access response to the client without control of the load balancer, wherein a source address of the access response comprises the IP address of the load balancer.

18. The load balancing method of claim 17, wherein changing the destination address of the access request to the IP address of the load balancer comprises receiving, by the virtual switch, a flow table from a network controller, and wherein the flow table instructs the virtual switch to change the destination address of the access request to the IP address of the load balancer according to the flow table when the virtual switch receives the access request that is to be sent to the at least one backend server.

19. The load balancing method of claim 17, wherein a second virtual router is configured to run on the service node, wherein a gateway address of the client and a gateway address of the at least one backend server are configured on the second virtual router, and wherein returning the access response to the client comprises:

sending, by the at least one backend server, the access response to a third port of the second virtual router, wherein an address of the third port comprises the gateway address of the at least one backend server;

receiving, by the second virtual router, the access response; and sending, by the second virtual router, the access response using a fourth port, wherein an address of the fourth port comprises the gateway address of the client.

20. A load balancing system in a virtualization environment, comprising:

a load balancer operating in direct routing mode; and
at least one service node coupled to the load balancer, wherein a virtual switch, a virtual router, and at least one backend server are configured to run on the at least one service node, wherein the load balancer and the at least one backend server are located on a same tenant network, wherein an Internet Protocol (IP) address of a logical interface of the at least one backend server comprises a virtual IP address of the load balancer, wherein the load balancer is configured to:
receive an access request from a client;
select a destination backend server for the client;
change a destination address of the access request to a local area network IP address of the destination backend server, wherein the virtual IP address of the load balancer and an IP address of a virtual network interface card of the destination backend server belong to different network segments using different local area network IP addresses; and send the access request to a destination service node on which the destination backend server is located, wherein a virtual router on the destination service node is configured to:

receive the access request;

change the destination address of the access request from the local area network IP address of the destination backend server to the IP address of the virtual network interface card of the destination backend server according to a first flow table; and send the access request to a virtual switch on the destination service node, wherein the virtual switch on the destination service node is configured to:

change the destination address of the access request to an IP address of a logical interface of the destination backend server according to a second flow table; and send the access request to the destination backend server, wherein the destination backend server is configured to:

receive and process the access request; and return an access response without control of the load balancer, wherein a source address of the access response is changed to the virtual IP address of the load balancer, and wherein the virtual router on the destination service node is further configured to change the source address of the access response to a public IP address of the load balancer according to a third flow table.

* * * * *